United States Patent Office 2,766,565
Patented Oct. 16, 1956

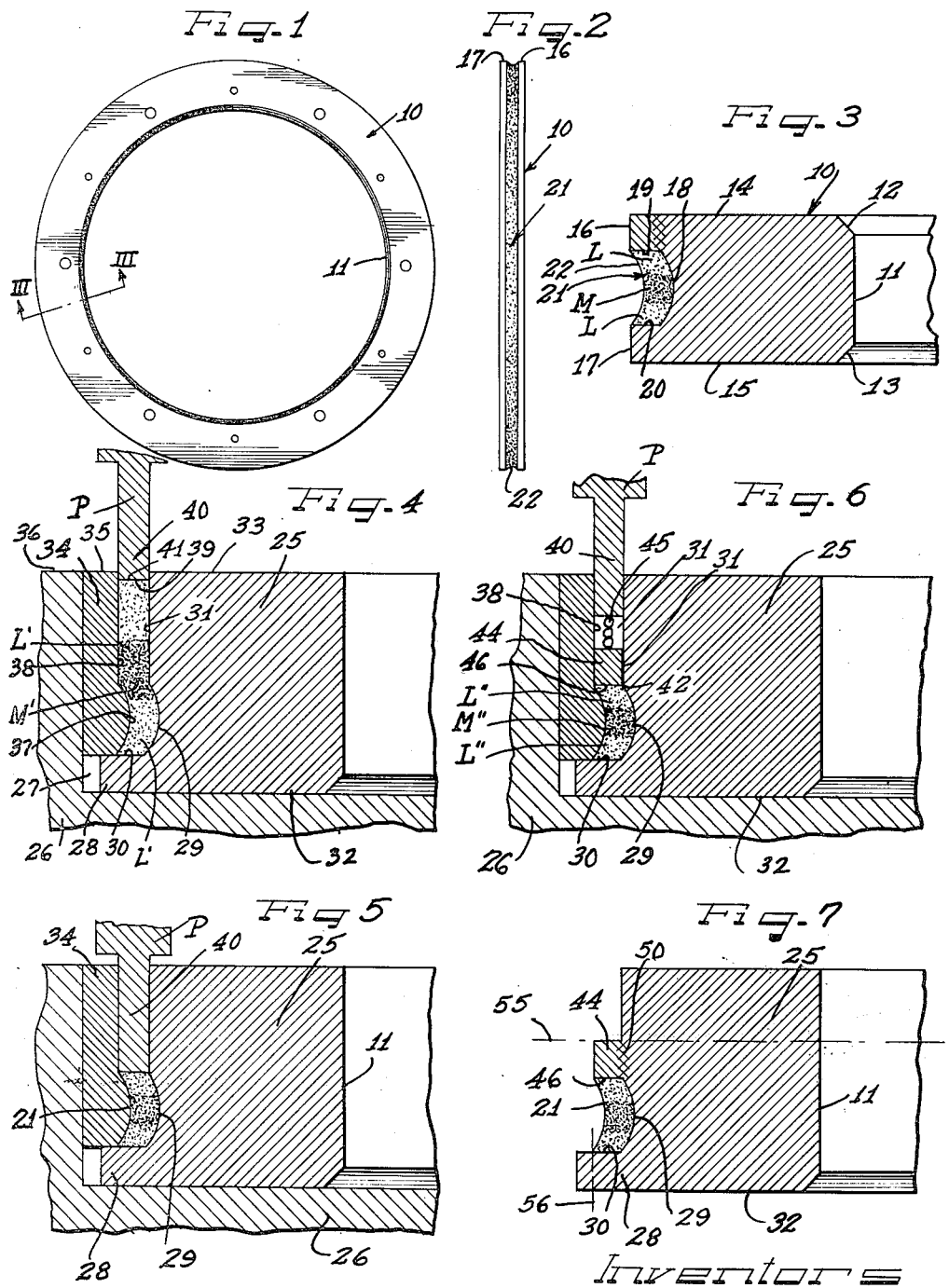

2,766,565

METAL BONDED ABRASIVE WHEEL AND METHOD OF MAKING THE SAME

Harold E. Robison and Leo Catallo, Detroit, Mich., assignors to Wheel Trueing Tool Company, Detroit, Mich., a corporation of Delaware Application March 23, 1954, Serial No. 418,118

6 Claims. (Cl. 51—206)

This invention relates to a metal bonded abrasive wheel and to a method of making the same. More particularly, the invention relates to an abrasive wheel for use in the edging of plate glass and, especially, laminated plate glass of the type commonly referred to as "safety glass."

In the grinding of the sandwich type of glass in which one or more layers of a suitable plastic, such as a vinyl plastic, is positioned between adjacent glass laminae, we have found that the diamond wheels heretofore used have had a comparatively short useful life. Although the bonding layer of plastic is softer than glass, itself, there nevertheless seems to be a tendency of the portion of the diamond grinding surface that contacts the plastic to become badly grooved in use. Various modifications of diamond grinding wheels were tried out before we discovered that excessive grooving of the diamond impregnated grinding surface can be avoided by increasing both the size and concentration of diamond particles in that portion of the grinding surface that comes into greatest contact with the plastic layer of the sandwich type glass. We have now found that diamond impregnated grinding wheels embodying this principle are much more efficient and have a longer useful life than the conventional diamond grinding wheels heretofore available.

It is therefore an important object of this invention to provide a diamond grinding wheel for edging laminated or sandwich type pate glass, and other forms of plate glass, wherein the diamond grinding surface is of improved form and construction imparting greater efficiency and longer life to the wheel.

It is a further important object of this invention to provide an improved diamond impregnated abrasive wheel for the edging of safety glass and the like wherein the diamond particles are larger and more concentrated in that portion of the diamond impregnated wheel that is more largely in contact with the plastic bonding material of the safety type glass.

It is a further important object of this invention to provide an improved method of making a diamond abrasive wheel whereby a wheel of greater efficiency and of longer useful life can be more inexpensively produced.

Other and further important objects of this invention become apparent from the following description and appended claims.

On the drawings:

Figure 1 is a plan view of a metal bonded abrasive wheel embodying the principles of our invention.

Figure 2 is an edge elevational view of the same.

Figure 3 is an enlarged sectional view taken substantially along the line III—III of Figure 1.

Figure 4 is an enlarged, fragmentary transverse sectional view of a mold and disc assembly illustrating one step of the method of our invention.

Figure 5 is a similar enlarged fragmentary view illustrating a subsequent step in our method.

Figure 6 is a similar enlarged fragmentary view illustrating a still further step in the method of our invention.

Figure 7 is a similar enlarged fragmentary view illustrating the final steps leading to the finished form of metal bonded abrasive wheel shown in Figures 1 to 3, inclusive.

As illustrated in Figures 1 to 3, inclusive, the finished metal bonded abrasive wheel of our invention includes an annulus member 10, preferably formed of metal, such as mild steel, or the like, having an inner cylindrical periphery 11, which is chamfered, as at 12 and 13 toward each face 14, and 15, respectively, of the annulus member 10. The annulus member 10 is provided with a pair of spaced flanges 16 and 17 that constitute extensions of the plane faces 14 and 15, respectively. Between said flanges 16 and 17 in the finished abrasive wheel is a groove having an arcuate shaped bottom wall 18, against which and between the inner surfaces 19 and 20 of said flanges 16 and 17, respectively, is bonded a metal-bonded abrasive layer 21. Said layer 21 is formed with a concave outer surface 22, which is generally of the same radius of curvature as the bottom surface 18, so that the layer 21 is of substantially uniform thickness radially of the annulus member 10.

Said annular layer 21, as will be better understood as this description proceeds, is of varying composition with regard to the size and concentration of abrasive particles, and, in accordance with our invention, said layer comprises lateral portions L in which the diamond particles are of substantially the same size and in substantially the same concentration with regard to the matrix in which said particles are embedded, and a central or median portion M, in which the diamond particles are slightly larger in size and in greater concentration with respect to the matrix than is the case in either of the lateral portions L. The median portion M thus presents a band composed of denser structure and of diamonds of larger particle size than the portions L, L on both axial sides thereof.

The method of making the metal-bonded abrasive wheel 10 is best shown in Figures 4 to 7, inclusive. An annulus 25, which is later to constitute the body portion of the finished annulus 10, is positioned in a carbon mold 26, which is provided with a cylindrical cavity 27 of the same or slightly greater diameter than the external diameter of said blank 25. The blank 25 is provided with a flange 28, which will later provide the flange 17 of the finished wheel, and with an arcuate annular groove 29 adjacent the inner end of the inner surface 30 of said flange 28. The bottom surface 29 of the groove corresponds with the bottom surface 18 of the finished groove. Beyond the other edge of the groove surface 29 is an annular end face 31 which is preferably a right cylindrical surface with respect to the plane faces 32 and 33 of the blank 25.

A carbon ring 34 is positioned in the mold cavity 27 to rest against the upper, or inner surface 30 of the flange 28 and to fit snugly against the inner annular surface of the cavity 27. The upper surface 35 of the carbon ring, or inset 34, lies flush with the upper surface 36 of the mold 26, and also flush with the upper surface 33 of the blank 25. The carbon insert 34 is provided with a convex surface 37, formed on the same radius as the bottom surface 29 of the groove and of the same length of arc. Beyond the convex surface 37 the surface of the insert 34 is cylindrical, as at 38 and lies in spaced relationship to and concentric with the cylindrical surface 31 of the blank 25. There is thus provided an annular space between the walls 38 and 31 and the lower arcuate walls 37 and 29.

As illustrated in Fig. 4, this space is filled up to a level 39, which is above the arcuate portions 29 and 37, with a mixture of abrasive particles and metal matrix. First, an abrasive particle-metal matrix mixture is charged into the annular space between the blank 25 and the carbon block 34 until a layer L' of the proper height has been formed; than a mixture of abrasive particles and matrix metal wherein the abrasive particles are generally larger and in greater proportion by weight of the matrix metal than in the layer L' is poured in until an intermediate layer M' of the desired height has been formed; and thereafter another mixture of substantially the same composition as that making up the layer L', is added to the level indicated by the reference numeral 39 to produce a second layer L'. Thus, there are two outside or lateral layers L' and an intermediate or median layer M', the total height of which, as shown in Figure 4, is greater than the width of the annular groove represented by the surface 29. As illustrative of the relative thickness of said layers L' and M', each may be, for instance, approximately one-quarter inch high before compression, to make a total height for the three layers of approximately three-quarters of an inch.

Compression of the three-layered mass of abrasive particles and matrix metal is effected by means of a plunger P, which has an annular depending portion 40 of such thickness and dimensions as to be received snugly between the cylindrical surfaces 31 and 38. Said plunger P has a lower annular plane face 41, between which and the inner surface 30 of the flange 28 on the blank 25 the mass of abrasive particles and matrix metal is compressed when the plunger is pressed thereagainst. In the first step, pressure alone is used without heat and sufficient pressure is employed to compact the three layers L', M' and L' to a level, such as indicated at 42 (Fig. 6) coincidental with the upper end of the arcuate surface 29. The amount of pressure used may vary from a few hundred to a few thousand pounds per square inch depending upon the desired density of the finished metal-bonded abrasive material. Since the pressure of the plunger P is fairly uniformly distributed throughout the depth of the three layers L', M' and L', each of the layers is compressed to approximately the same extent, and their compacted thickness is illustrated in Figure 6 by the corresponding layers L'', M'' and L''.

As shown in Figure 6, after the compression of the mixture of abrasive particles and matrix metal has been effected, a metal ring 44 is laid on the top of the top layer L'' within the space between the surfaces 31 and 38, the ring 44 being preferably rectangular in cross section and of sufficient thickness to be freely received into said space. Brazing material 45, which may be in the form of fine rings or coils of copper, brass, German silver, or the like, is then positioned above the ring 44 and the whole assembly heated in a reducing atmosphere until the brazing material 45 has reached its fusion point. When fused, the brazing material supplied from the rings 45 flows around the ring 44 and into the layers L'', M'' and L'' to fill the voids thereof and bond the particles of metal and abrasives together and also to effect a bond between the composite layer and the bottom surface 29, and between the composite layer and the surface 30 and under surface 46 of said ring 44, as well as bond said ring to the face 31 of the blank 25.

During or immediately following the fusion of the brazing material 45, the plunger P is pressed against the resulting assembly to further compact the composite layer, or at least hold the same under pressure and thereby insure a good bond between said composite layer and the enclosing surfaces 30, 29 and 46 (Fig. 6).

As illustrated in Figure 7, the assembly is next removed from the carbon mold 26, with the ring 44 brazed in place as indicated by the common sectioning along the line 50, and with the composite layer 21 bonded in place against the bottom surface 29 of the groove and the surfaces 30 and 46 of the flange 28 and ring 44, respectively. In subsequent steps, a portion of the blank 25 is removed, as by machining to the dot and dash line 55 to reduce the thickness of said blank to that of the finished annulus member 10. The projecting end of the flange 28 is likewise machined to the dash line 56 to form the flange 17 of the finished wheel, and the wheel is finally provided with the chamfered surface 12 by machining along the dotted line 57 (Fig. 7). Likewise, the inner wall 11 is machined so as to be concentric to the annular matrix mass 21.

One advantage in starting with a thicker blank, such as the blank 25, than is necessary to produce the finished wheel is that there is less tendency of the blank to warp when heated to above the fusion point of the brazing material 45. Also, if any warpage does occur, it can be corrected by the removal of the metal of the blank along the line 55 (Fig. 7), and also by machining the bottom face, 32, of the wheel.

The composition of the mixture of abrasive particles and metal particles may be varied to suit the particular requirements imposed by the use to which the wheel is to be put, but, preferably, diamond particles are used as the abrasive material and tungsten metal powder as the matrix material. In the layers L, L, a suitable concentration of diamond particles is one carat of 150 to 170 mesh diamond powder to every four and one-half grams of tungsten powder. In the center section M, a proportion of one carat of 80 to 100 mesh diamond powder to every three and one-half grams of tungsten powder has been found eminently satisfactory. By increasing the average size of the diamond particles and the concentration of diamond particles relative to the metal used as the matrix material we have found that the efficiency and the useful life of the wheel are greatly increased. When the center or median section M of the metal-bonded abrasive layer 21 is of the composition just specified, there seems to be much less tendency for the plastic bonding layer of laminated plate glass to groove the layer M so quickly and so badly as where the abrasive layer is all of the same but lower size and concentration of diamond particles. It would, of course, be feasible to make the lateral layers L, L of the same composition as specified for the median layer M, namely, one carat of 80 to 100 mesh diamond powder to every three and one-half grams of tungsten powder, but it is not necessary to use the larger size or the heavier concentration of diamond particles in the lateral layers and therefore there is some economy realized by using different compositions for the different layers or sections of the abrasive portion of the wheel. Furthermore, the finer diamond particles in lesser concentration that are used in the lateral sections L, L actually seem to perform their function of grinding the edge of the plate glass more efficiently than larger size diamond particles, and except for the destructive action of the plastic bonding layer upon the abrasive layer, there would be no reason to go to the larger size diamond particles and the higher concentration of such diamond particles relative to the matrix material. Of the various plastics that are used in bonding plate glass laminae together, the worst offender from the standpoint of wear and tear on the abrasive wheel is Vinylite, which is a polymerized vinyl acetate. However, other synthetic thermoplastic resins appear to have a simliar though sometimes less deleterious effect upon the abrasive layer of the wheel used in edging the laminated glass.

The method used in making the abrasive layer 21 is preferably that described in the Petrie Patent No. 2,210,039, except that the pressures and temperatures may be somewhat less. The tungsten powder and diamond particles are substantially uniformly mixed before filling the space between the blank 25 and the carbon insert 34. After the successive layers L', M', and L', have been formed, the plunger P is forced downwardly against the composite layers to compress them to about one-half or even less of their original volume. A compressive force in the neighborhood of 1000 pounds per square inch is sufficient for this purpose, when the tungsten powder is of approximately 200 mesh size and smaller. This first pressing operation is carried out in the cold.

After the first compacting operation, the entire mold and assembly (Fig. 6) are placed in a furnace providing a hydrogen, or other reducing gas, atmosphere and maintained at a temperature of around 1900 to 2100° F. The temperature will depend in part upon the nature of the brazing material and its fusion point. The heating is preferably carried out in two stages, the first being in the neighborhood of 1900 to 2050° F. and the second at somewhat higher temperatures. During the initial heating step, the brazing material may be absent or present, as desired, and it is optional whether any further compacting be carried out. In general, pressures of not over 500 pounds per square inch can be used, since the graphite mold cannot withstand substantially higher pressures. Approximate pressure is applied during the second heating stage. During that stage, the brazing material fuses and flows to fill the voids and interstices between the tungsten particles and also to effect a bond between all contacting or closely adjacent surfaces of the ring 44, the layer 21 and the blank 25.

The metal bonded abrasive wheel of our invention results in a very considerable saving in the cost of edging sandwich glass. Heretofore the major part of wheel breakdown has occurred at the center where the plastic layer of the glass sandwich contacts the abrasive wheel. In the case of Vinylite, while it is comparatively soft, it is also tough, and the action of the present wheels is not a true cutting action, but more of a squeezing and rolling action in contact with the plastic. This causes undue heat and pressure to be generated at the center of the cutting face of the wheel, as is proved by the rapid appearance of a groove at this point. The groove gets progressively deeper and soon gets deep enough to cause the rejection of glass that has been edged by the use of such a wheel. The sides of the diamond wheel matrix then have to be dressed down to the level of the bottom of the groove. This procedure is an absolute waste of diamond and matrix, and, in fact, results in the dissipation of an amount diamond matrix that far exceeds the amount actually removed by useful work.

A metal bonded abrasive wheel such as herein described has a useful life that is often double or even triple that of the conventional abrasive wheel. By placing the larger diamond particles in the center of the cutting face, and in greater concentration at the center, where the groove normally appears, the diamond particles present more cutting surfaces because more of the surfaces of larger particles are exposed than in the case of smaller particles. The plastic layer of the sandwich glass is more easily cut by sharp edges such as are provided by the larger and more concentrated diamond particles at the center of the abrasive layer. The larger diamond particles also serve to maintain a freer cutting action by preventing the thermoplastic material from "loading up" between the glass and the wheel.

It will be understood that modifications and variations may be effected without departing from the scope of the novel concepts of the present invention.

We claim as our invention:

1. A diamond wheel for edging laminated glass, comprising a metal annulus having spaced annular flanges providing a groove therebetween and a layer of a sintered metal matrix having diamond particles distributed therein and bonded thereto, said matrix being secured in said groove to the surfaces defining the same, said layer presenting a concave external surface between said flanges the diamond particles in the median portion of said layer being slightly larger in size and in greater concentration with respect to said matrix than in either of the axially lateral portions of said layer.

2. A diamond wheel for edging laminated glass, comprising a metal annulus having spaced annular flanges providing a groove therebetween and a layer of a diamond impregnated matrix secured in said groove to the surfaces defining the same, said layer presenting a concave external surface between said flanges and having a greater concentration of larger diamond particles in its median portion than elsewhere, the median portion having about 1 carat of 80 to 100 mesh diamond powder to every 3.5 grams of matrix and the portions laterally of said median portion having about 1 carat of 150 to 170 mesh diamond powder to every 4.5 grams of matrix.

3. The method of making an abrasive impregnated wheel for edging laminated glass, which comprises providing an annular metal blank having a single annular flange and an annular concave groove adjacent said flange, providing a temporary mold wall against said flange to form with said flange and groove a mold cavity having an annular concave outer face opposed and of similar contour to said groove, introducing into said cavity against said flange to a predetermined depth a first mixture of a binder matrix and abrasive particles of predetermined size and concentration, thereafter introducing into said cavity on top of said first mixture a second mixture having abrasive particles of relatively larger size and greater concentration, thereafter introducing into said cavity on top of said second mixture another portion of said first mixture, subjecting all of the mixtures so introduced to sufficient heat and pressure to set said binder matrix with said abrasive particles into a layer substantially coextensive in height to the width of said groove, inserting a metal ring against said layer in contact with said blank and said temporary mold wall, bonding said layer to said ring, flange and blank, removing said mold wall and machining said blank into a wheel having parallel plane faces with a pair of spaced annular flanges confining said layer therebetween.

4. A diamond wheel for edging laminated glass, comprising a metal annulus having spaced annular flanges providing an annular groove therebetween, a unitary layer of a diamond impregnated matrix in said groove secured to the surfaces defining the same, said layer presenting a concave external surface between said flanges and the median portion of said layer presenting a band composed of denser structure and of diamonds of larger particle size than the portions of said layer on both axial sides thereof.

5. The method of making an abrasive impregnated wheel for edging glass, which comprises providing an annular member with an annular flange and with an adjacent annular groove in the annular face of said member, positioning a ring about said member to abut against said flange and present an annular surface conforming with and spaced from said annular face to provide an annular molding cavity closed at one end by said flange and open at the other end, successively introducing into said cavity a first lateral portion, a median portion and a second lateral portion of mixtures of a bonding matrix and abrasive particles, the bonding matrix being the same in all portions but the abrasive particles in the median portion being larger and in greater concentration with respect to said matrix than in the first and second lateral portions, and subjecting said portions to pressure and heat to compact and set the same into a layer of abrasive particles and matrix bonded together and to the adjacent flange and groove surfaces.

6. The method of making an abrasive impregnated wheel for edging glass, which comprises providing an annular member with an annular flange and with an adjacent annular groove in the annular face of said member, positioning a ring about said member to abut against said flange and present an annular surface conforming with and spaced from said annular face to provide an annular molding cavity closed at one end by said flange and open at the other end, successively introducing into said cavity a first lateral portion, a median portion and a second lateral portion of mixtures of a bonding matrix and abrasive particles, the bonding matrix being the same in all portions but the abrasive particles in the median portion being larger and in greater concentration with respect to said matrix than in the first and second lateral portions, compacting said portions to confine a layer of the same within the width of said annular groove, positioning a ring against said compacted layer in axially opposed relation to said flange and in contact with said annular surface to provide a second flange for said groove, positioning brazing material adjacent said ring, heating the resulting assembly to a sufficiently high temperature to cause said brazing material to melt and infiltrate said compacted layer and exerting a pressure through said ring against said layer to cause said ring to be brazed to said layer and to said annular member.

References Cited in the file of this patent

UNITED STATES PATENTS

| | | |
|---|---|---|
| 1,616,531 | King | Feb. 8, 1927 |
| 2,022,530 | White | Nov. 26, 1935 |
| 2,210,039 | Petrie | Apr. 10, 1939 |
| 2,268,599 | Kinney et al. | Jan. 6, 1942 |
| 2,277,696 | Goddu | Mar. 31, 1942 |